United States Patent
Zhang et al.

(10) Patent No.: US 7,085,291 B2
(45) Date of Patent: Aug. 1, 2006

(54) NETWORK LAYER PROTOCOL AWARE LINK LAYER

(75) Inventors: Hang Zhang, Nepean (CA); Mo-han Fong, L'Orignal (CA)

(73) Assignee: Nortel Networks Limited, St. Laurent (CA)

(*) Notice: Subject to any disclaimer, the term of this patent is extended or adjusted under 35 U.S.C. 154(b) by 775 days.

(21) Appl. No.: 09/897,940

(22) Filed: Jul. 5, 2001

(65) Prior Publication Data

US 2002/0024944 A1 Feb. 28, 2002

Related U.S. Application Data

(60) Provisional application No. 60/219,444, filed on Jul. 20, 2000.

(51) Int. Cl.
*H04J 3/24* (2006.01)

(52) U.S. Cl. .............. 370/473; 370/472; 370/470

(58) Field of Classification Search .......... 370/349, 370/389, 392, 393, 394, 465, 469, 470, 471, 370/472, 473, 474, 466
See application file for complete search history.

(56) References Cited

U.S. PATENT DOCUMENTS 5,440,545 A  8/1995 Buchholz et al.
6,226,301 B1 * 5/2001 Cheng et al. ............... 370/474
6,370,118 B1 * 4/2002 Lioy et al. .................. 370/235
6,507,582 B1 * 1/2003 Abrol ......................... 370/394
6,665,313 B1 * 12/2003 Chang et al. ............... 370/469
6,816,471 B1 * 11/2004 Ludwig et al. ............. 370/331

OTHER PUBLICATIONS

Telecommunications Industry Association (TIA): "Data Services Option Standard for Wideband Spread Spectrum Digital Cellular System" TIA/EIA Interim Standard, Chapter 3, Online! Jul. 1995, pp. I, 10-28, XP002233144.
Mathis M. et al, "TCP Selective Acknowledgment Options" IETF RFC 2018, Oct. 1996, XP002932724.

* cited by examiner

*Primary Examiner*—Duc Ho
*Assistant Examiner*—Thien D. Tran
(74) *Attorney, Agent, or Firm*—Dennis R. Haszko; Borden Ladner Gervais LLP

(57) ABSTRACT

An enhanced radio link protocol (RLP) in a wireless access network that is network aware is disclosed. The RLP increases radio link quality by various ARQ mechanisms. The RLP framing structure is included that supports and enables at least network layer packet boundary detection, dynamic and adaptive ARQ schemes for QoS support on a per-packet basis, and a flexible RLP frame structure for fast adaptation to physical layer channel rate/RLP frame sizes. Optional uses include supporting negative acknowledgment (NAK) based ARQ.

8 Claims, 7 Drawing Sheets

No. of NAKs: 010 (binary) — 3 bits

First occurrence for packet X

| Re-tx payload type | 0 (binary) | 1 bit |
| IP packet sequence number | X (decimal) | 8 bits |

Second occurrence for packet X+2

| Re-tx payload type | 1 (binary) | 1 bit |
| IP packet sequence number | X+2 (decimal) | 8 bits |
| Number of holes | 000010 (binary) | 6 bits |

First occurrence for first hole in packet X+2

| Octet sequence number | Y (decimal) | 11 bits |
| Length in octets | N (decimal) | 6 bits |

Second occurrence for second hole in packet X+2

| Z (decimal) | 11 bits |
| K (decimal) | 6 bits |

FIGURE 6

NETWORK LAYER PROTOCOL AWARE LINK LAYER

CROSS REFERENCE TO RELATED APPLICATIONS

This application claims priority to the U.S. Provisional Patent Application Ser. No. 60/219,444 filed on Jul. 20, 2000.

BACKGROUND OF THE INVENTION

1. Field of the Invention

The present invention involves quality of service (QoS) enhancements within wireless communications systems. Moreover, the present invention addresses problems associated with existing automatic repeat request (ARQ) design. More specifically, the present invention defines a radio link protocol (RLP) format of the link layer that is network aware.

2. Description of the Prior Art

Within wireless access networks, the function of RLP is to provide improved radio link quality by way of various ARQ mechanisms. RLP provides an octet stream transport service over forward and reverse channels. RLP is unaware of higher layer framing and operates on a featureless octet stream, delivering the octets in the order received. Current third generation (3G) wireless systems include formats of the link layer that are not network layer protocol aware. That is to say, such existing RLP designs treat network layer packets (e.g., internet protocol (IP) packet streams) as octet streams and thus ignore a given network layer (e.g., IP) packet's boundary. This results in inefficient use of radio resources.

A variety of problematic issues related to current RLP design exists including an incapability to support differential and dynamic end-to-end internet/IP QoS levels over wireless systems. Examples of where QoS has been hampered in the wireless area include interactive services, stream services, and the like. Currently, there is a typical over-provisioning of network resources (RF, H/W) to ensure required QoS is met. Such network resources include, among other things, radio frequency (RF) and hardware (H/W). This problem is particularly acute for packet data applications that inherently involve bursty traffic.

Further, current 3G systems have been unable to provide tight QoS control/feedback for each type of service. Correction of such system deficiencies is desirable to both the current 3G standards/products (e.g., CDMA2000, UMTS) and enhanced 3G standards/products, (e.g., HDR). Still further, such QoS issues are relevant to both future mobile and fixed wireless access products. What is uniformly clear is that a solution to QoS problems needs to adapt to different physical channel rates.

SUMMARY OF THE INVENTION

It is desirable to obviate or mitigate one or more of the above-identified disadvantages associated with QoS within communications systems. The present invention proposes a new RLP framing structure that enhances conventional RLP design and, at the same time, resolves the existing problems with QoS support.

The RLP framing structure of the present invention supports and enables at least network layer (e.g., IP) packet boundary detection, dynamic and adaptive ARQ schemes for QoS support on a per-packet basis, and a flexible RLP frame structure for fast adaptation to physical layer channel rate/ RLP frame sizes. Optionally, the present invention can be used to support negative acknowledgment (NAK) based ARQ.

Other aspects and features of the present invention will become apparent to those of ordinary skill in the art upon review of the following description of specific embodiments of the invention in conjunction with the accompanying figures.

BRIEF DESCRIPTION OF THE DRAWINGS

FIG. 6 is a diagram showing a NAK header according to the present invention.

DETAILED DESCRIPTION OF THE INVENTION

Figure 1:
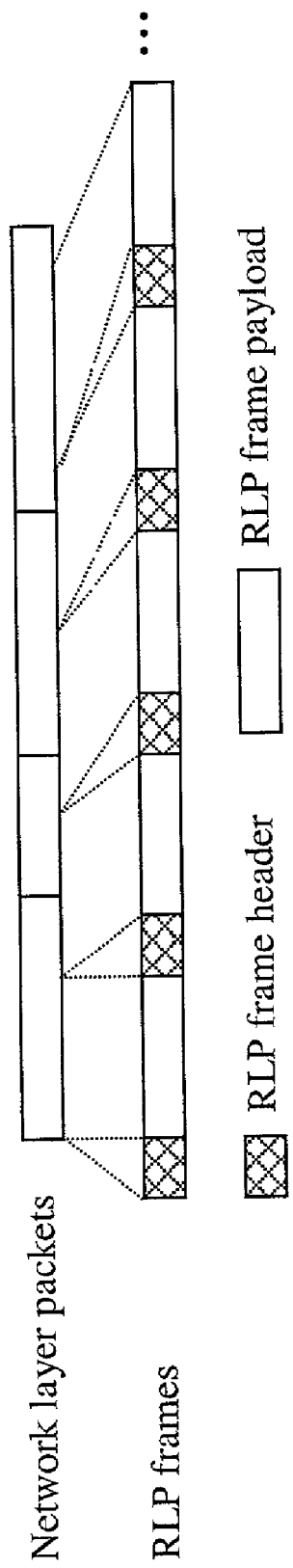
FIG. 1 is a diagram showing known RLP frames in relation to network layer packets.
Figure 2:
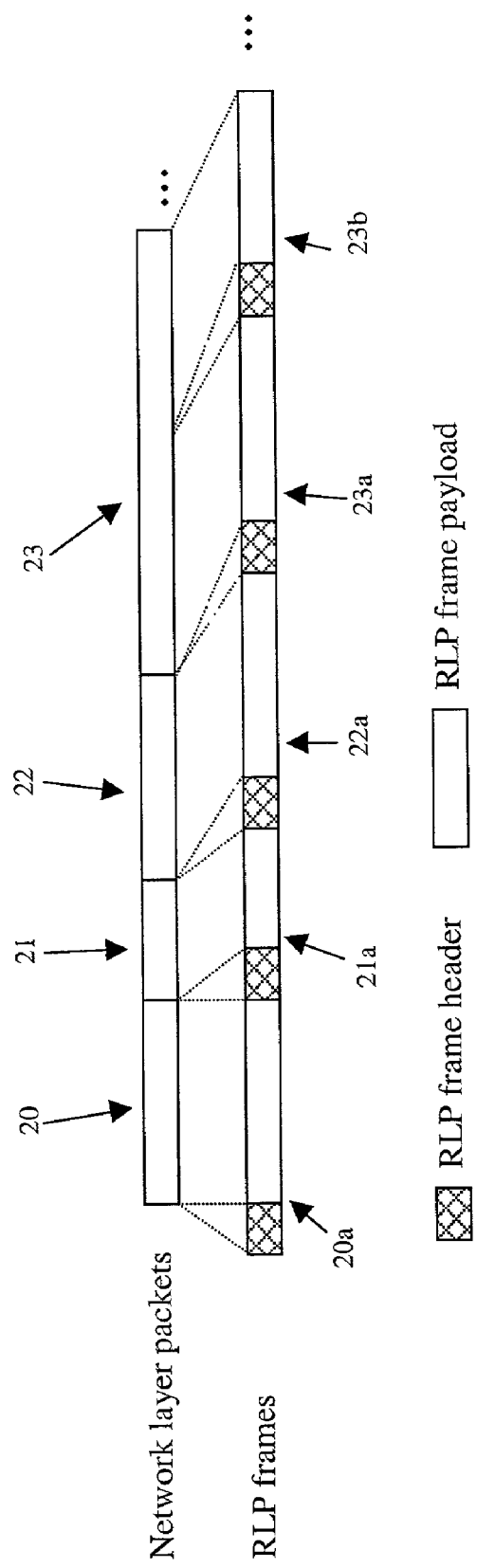
FIG. 2 is a diagram showing RLP frames in relation to network layer packets in accordance with the present invention.

In FIG. 1, current 3G architecture is shown where the network layer packets (i.e., IP packets) and corresponding RLP frames do not align with respect to packet boundaries. FIG. 2, however, shows the present invention where each RLP frame corresponds to either an entire IP packet or a portion of an IP packet. As shown, IP packets 20 to 22 correspond to RLP frames 20a to 22a, respectively, whereas packet 23 corresponds to RLP frames 23a and 23b. It should be noted, and will be discussed further below, that RLP frames 20a to 23a each align with respective boundaries of IP packets 20 to 23. Each RLP frame 20a, 21a, 22a, 23a, and 23b includes an RLP frame header and RLP frame payload.

Figure 3:
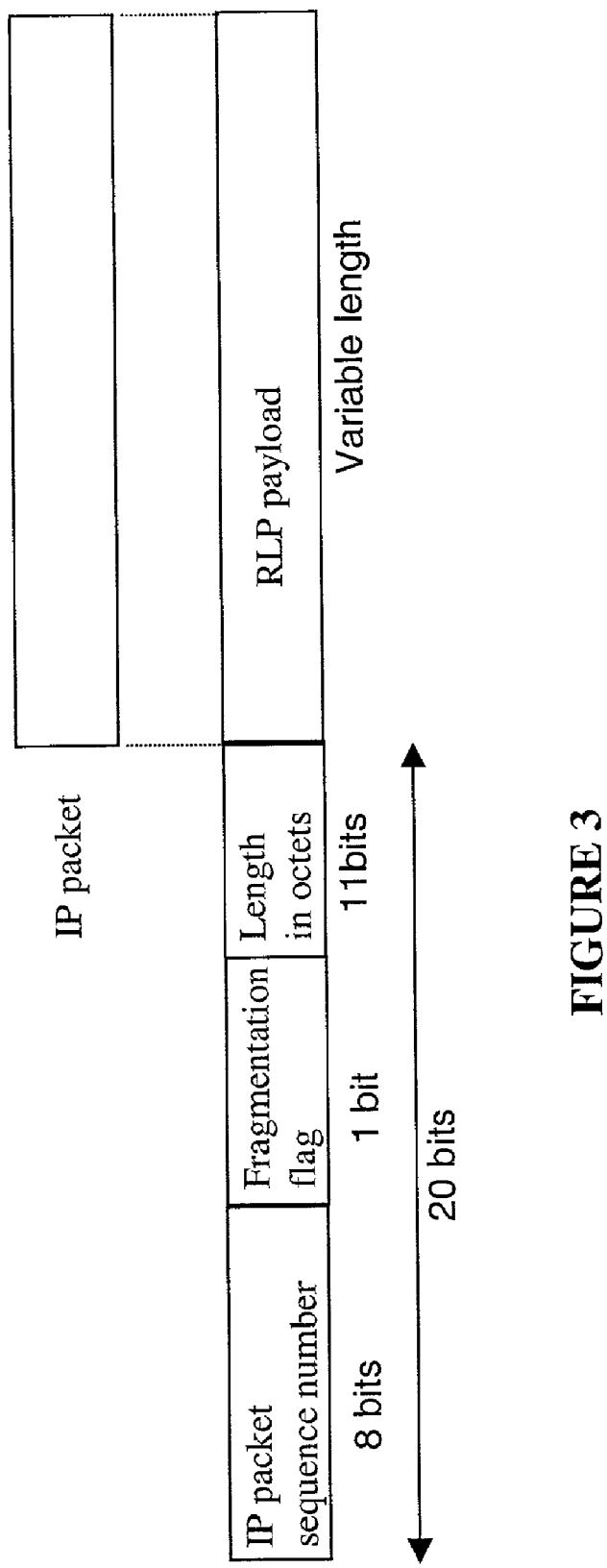
FIG. 3 is a diagram showing a non-fragmented RLP frame according to the present invention.

FIGS. 3 though 5 show RLP frame structure according to the present invention. Specifically, the non-fragmented RLP frame shown in FIG. 3 corresponds to RLP frame 20a of FIG. 2. Similarly, the fragmented RLP frame shown in FIG. 4 corresponds to RLP frame 23a of FIG. 2 where the RLP frame header is 21 bits long when, as is the case here, the RLP frame represents the first fragment of an IP packet. Further, the fragmented RLP frame shown in FIG. 5 corresponds to RLP frame 23b of FIG. 2 where the RLP frame header is 32 bits long when, as is now the case, such RLP frame represents the non-first fragment of an IP packet.

Figure 4:
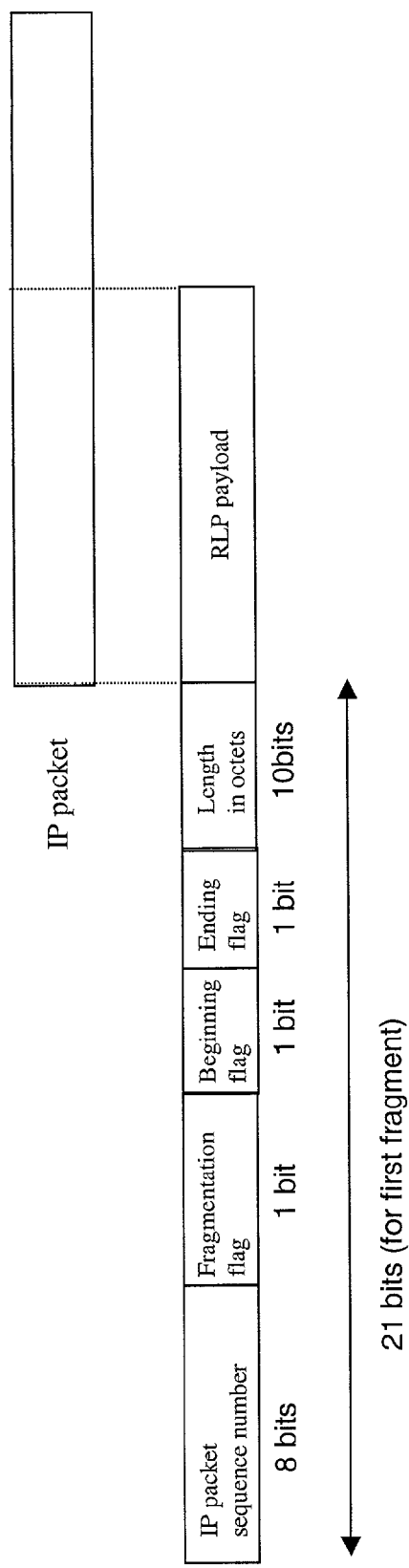
FIG. 4 is a diagram, according to the present invention, showing a fragmented RLP frame corresponding to a first IP packet fragment.
Figure 5:
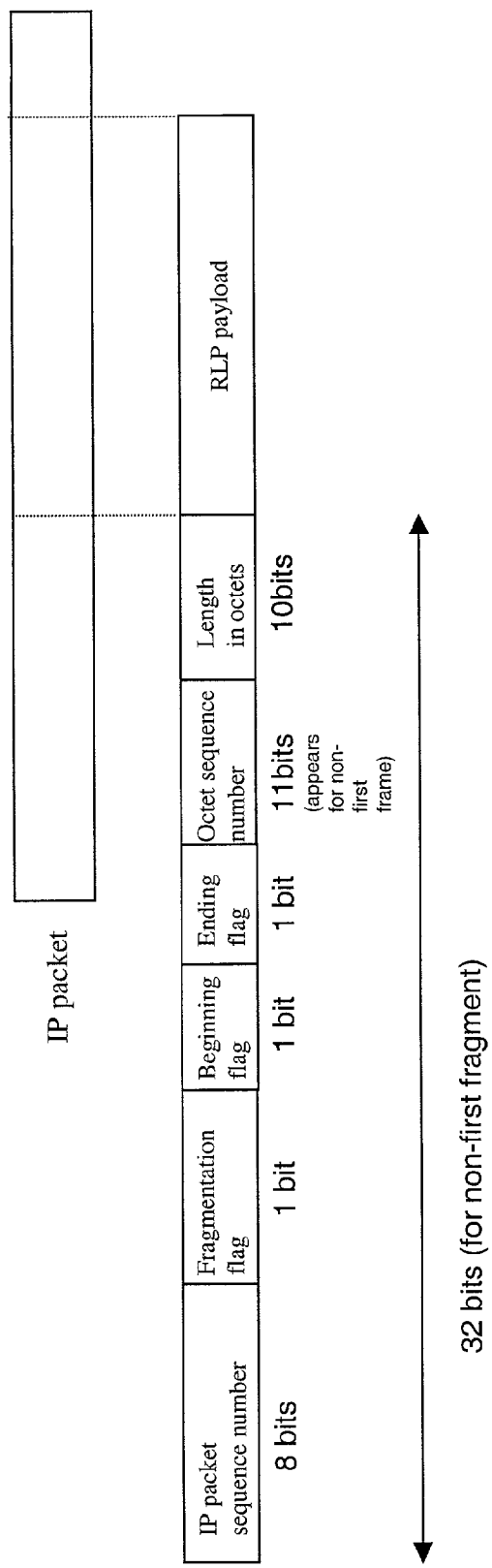
FIG. 5 is a diagram, according to the present invention, showing a fragmented RLP frame corresponding to a non-first IP packet fragment.

In operation, the present invention is a new RLP framing structure supports and enables network layer packet boundary detection as shown by FIGS. 2 through 5. The present invention works by defining each RLP framing structure as an RLP frame that encapsulates either an IP packet or a fragment of an IP packet. The header of each RLP frame includes bits as indicated in FIGS. 3 through 5. Specifically, each RLP header includes an 8-bit packet sequence number that is an incremental sequence number to identify each packet. A one bit fragmentation flag is also included that will identify whether the given RLP frame is a fragment or not.

For a given non-fragmented RLP frame, a length in unit of octets of 11 bits is used to indicate the length of a packet. Overall, the header in a non-fragmented RLP frame is 20 bits.

As shown in FIGS. 4 and 5, for a given fragmented RLP frame, a length in unit of octets of 10 bits is used to indicate the length of a packet fragment. If the one bit fragmentation flag indicates that the given RLP frame is a fragment of the respective packet, then a fragment beginning flag and fragment ending flag at one bit each will also be included in the RLP frame. The fragment beginning flag indicates whether the RLP frame is the first fragment of the given IP packet. The fragment ending flag indicates whether the RLP frame is the last fragment of the given IP packet. In either a first fragmented RLP frame or non-first fragmented RLP frame, there is a 10-bit length in unit of octet that indicates the length of the respective IP packet or fragment of IP packet. In a non-first fragmented RLP frame, there is also an 11-bit long octet sequence number. The octet sequence number is used to identify the first octet in a fragment. Overall, the header in a fragmented RLP frame is either 21 bits (for the first fragmented frame) or 32 bits (for the subsequent non-first fragmented frame(s)).

FIG. 6 shows an optional use of the present invention to support NAK based ARQ. The present invention forms an RLP retransmission mechanism where the RLP frame or part of the RLP frame is a retransmission unit. Specifically shown in this respect in FIG. 6 is a NAK control message header. The header includes 3 bits designated for the number of NAKs that are the total number of packets requested to re-transmit by the given NAK message. There is 1 bit designated for retransmit payload type where "0" represents retransmit of an entire packet and "1" represents retransmit of only parts of a packet. There is an 8 bit IP packet sequence number for sequential numbering of each IP packet. There is a 6 bit number of holes that appears if the retransmit payload type bit is "1". There is an 11-bit octet sequence number for sequential numbering of each octet as well as a 6-bit length in octets.

Figure 7:
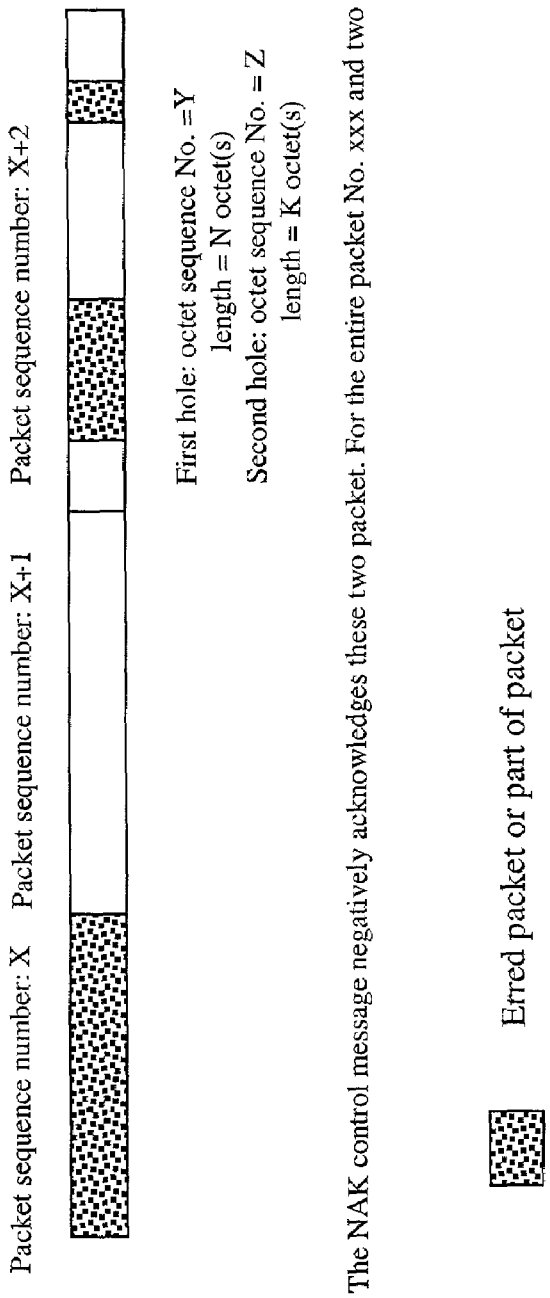
FIG. 7 is an example of a NAK control message according to the present invention.

In operation, where NAK is one entire IP packet, NAK message length will be 12 bits. Where there are n-holes of NAK in an IP packet, the NAK message length will be 18+n×17 bits. FIG. 7 is an example of a NAK control message.

While the above embodiments of the present invention were described in specific terms, it should be recognized that there are other desirable methodologies and uses possible without straying from the intended scope of the invention. Persons skilled in the art will appreciate that there are yet more alternative implementations and modifications possible for implementing the present invention, and that the above implementation is only an illustration of this embodiment of the invention. Accordingly, the scope of the invention is intended only to be limited by the claims included herein.

We claim:

1. A frame structure for a wireless access network having internet protocol (IP) packets, said frame structure comprising:
   a plurality of radio link protocol (RLP) frames, each said RLP frame corresponding to either a whole IP packet of said wireless access network or a partial IP packet of said wireless access network;
   wherein each said RLP frame that corresponds to said whole IP packet includes a non-fragmented RLP frame header that corresponds to a beginning of said whole IP packet;
   each said RLP frame that corresponds to said partial IP packet includes a first fragmented RLP frame header that corresponds to a beginning of said partial IP packet and a second fragmented RLP frame header that corresponds to other than said beginning of said partial IP packet; and wherein
   each said non-fragmented RLP frame header is 20 bits in length;
   each said first fragmented RLP frame header is 21 bits in length; and each said second fragmented RLP frame header is 32 bits in length.

2. The frame structure as claimed in claim 1, wherein each said non-fragmented RLP frame header includes an eight bit packet sequence number, a one bit fragmentation flag, and an eleven bit length in unit of octets;
   each said first fragmented RLP frame header includes an eight bit packet sequence number, a one bit fragmentation flag, a one bit beginning flag, a one bit ending flag, and a ten bit length in unit of octets; and
   each said second fragmented RLP frame header includes an eight bit packet sequence number, a one bit fragmentation flag, a one bit beginning flag, a one bit ending flag, an eleven bit octet sequence number, and a ten bit length in unit of octets.

3. A frame structure for a wireless access network having internet protocol (IP) packets, said frame structure comprising:
   a plurality of radio link protocol (RLP) frames, each said RLP frame corresponding to either a whole IP packet of said wireless access network or a partial IP packet of said wireless access network;
   wherein each said RLP frame that corresponds to said whole IP packet includes a non-fragmented RLP frame header that corresponds to a beginning of said whole IP packet; and each said RLP frame that corresponds to said partial IP packet includes a first fragmented RLP frame header that corresponds to a beginning of said partial IP packet and a second fragmented RLP frame header that corresponds to other than said beginning of said partial IP packet; and
   wherein said frame structure forms an RLP retransmission mechanism where said RLP frame or part of said RLP frame is a retransmission unit; and
   wherein said RLP retransmission mechanism includes a negative acknowledgement (NAK) control message, wherein said NAK control message includes:
   three bits designated for a number of NAKs that are a total number of IP packets requested to re-transmit;
   one bit designated for retransmit payload type;
   eight bits designated for an IP packet sequence number;
   eleven bits designated for an octet sequence number, and six bits designated for octet length; and
   wherein when said retransmit payload type is zero, said NAK control message further includes six bits designated for a number of holes.

4. The frame structure as claimed in claim 3, wherein said NAK control message is 12 bits in length when said frame structure corresponds to a whole IP packet and said NAK control message is 18+n×17 bits in length, where n equals said number of holes, when said frame structure corresponds to less than a whole IP packet.

5. A method for assigning a frame structure for a wireless access network having internet protocol (IP) packets, said method comprising:
   providing a plurality of radio link protocol (RLP) frames, each said RLP frame corresponding to either a whole IP packet of said wireless access network or a partial IP packet of said wireless access network, said RLP frames each aligning with respective boundaries of said IP packets, each said RLP frame that corresponds to said whole IP packet includes a nonfragmented RLP frame header that corresponds to a beginning of said whole IP packet, each said RLP frame that corresponds to said partial IP packet includes a first fragmented RLP frame header that corresponds to a beginning of said partial IP packet and a second fragmented RLP frame header that corresponds to other than said beginning of said partial IP packet;

providing a length of 20 bits for each said non-fragmented RLP frame header;

providing a length of 21 bits for each said first fragmented RLP frame header; and providing a length of 32 bits for each said second fragmented RLP frame header.

6. The method as claimed in claim 5, further comprising providing an eight bit packet sequence number, a one bit fragmentation flag, and an eleven bit length in unit of octets to each said non-fragmented RLP frame header;

providing an eight bit packet sequence number, a one bit fragmentation flag, a one bit beginning flag, a one bit ending flag, and a ten bit length in unit of octets to each said first fragmented RLP frame header; and providing an eight bit packet sequence number, a one bit fragmentation flag, a one bit beginning flag, a one bit ending flag, an eleven bit octet sequence number, and a ten bit length in unit of octets to each said second fragmented RLP frame header.

7. A method for assigning a frame structure for a wireless access network having Internet protocol (IP) packets, said method comprising:

providing a plurality of radio link protocol (RLP) frames, each said RLP frame corresponding to either a whole IP packet of said wireless access network or a partial IP packet of said wireless access network, wherein each said RLP frame that corresponds to said whole IP packet includes a non-fragmented RLP frame header that corresponds to a beginning of said whole IP packet; and each said RLP frame that corresponds to said partial IP packet includes a first fragmented RLP frame header that corresponds to a beginning of said partial IP packet and a second fragmented RLP frame header that corresponds to other than said beginning of said partial IP packet; and forming an RLP retransmission mechanism where said RLP frame or part of said RLP frame is a retransmission unit that includes a negative acknowledgement (NAK) control message; further comprising providing three bits for a number of NAKs that are a total number of IP packets requested to re-transmit;

providing one bit for retransmit payload type;

providing eight bits for an IP packet sequence number;

providing eleven bits for an octet sequence number;

providing six bits for octet length; and when said retransmit payload type is zero, providing six bits for a number of holes.

8. The method as claimed in claim 7, wherein said NAK control message is 12 bits in length when said frame structure corresponds to a whole IP packet and said NAK control message is 18+n×17 bits in length, where n equals said number of holes, when said frame structure corresponds to less than a whole IP packet.

* * * * *